March 3, 1953

M. STIGERS ET AL 2,630,023

FLUID TRANSMISSION

Filed Jan. 12, 1949

Inventors
Melburne Stigers
Dana Stigers

By *Clarence A. O'Brien*
and *Harvey B. Jacobson*
Attorneys

Patented Mar. 3, 1953

2,630,023

UNITED STATES PATENT OFFICE 2,630,023

FLUID TRANSMISSION

Melburne Stigers and Dana Stigers,
Tucson, Ariz.

Application January 12, 1949, Serial No. 70,466

1 Claim. (Cl. 74—688)

This invention comprises novel and useful improvement in a fluid transmission and more specifically pertains to a power transmission mechanism suitable for automotive vehicles for providing various speed ratios between an internal combustion engine and a driven shaft.

The principal object of this invention is to provide an improved fluid transmission having a substantially infinite number of speed ratios between the engine and a driven shaft, and which may be selectively placed into forward drive or reverse drive, each of which possesses the aforementioned infinite number of speed ratios.

An important feature of the invention resides in the provision of a fluid transmission having a pair of planetary gearing assemblies connected in series, together with means for varying the operation of the planetary gear carriers for regulating the effective power transmission of the assembly.

A further important feature of the invention resides in the provision of a novel mechanism for shifting one of the planetary gear carriers to selectively establish a direct driving engagement between the engine of the vehicle and the driving shaft.

These, together with various ancillary features and objects of the invention which will later become apparent as the following description proceeds, are attained by this device, a preferred embodiment of which has been illustrated by way of example only in the accompanying drawings, wherein:

Figure 1:
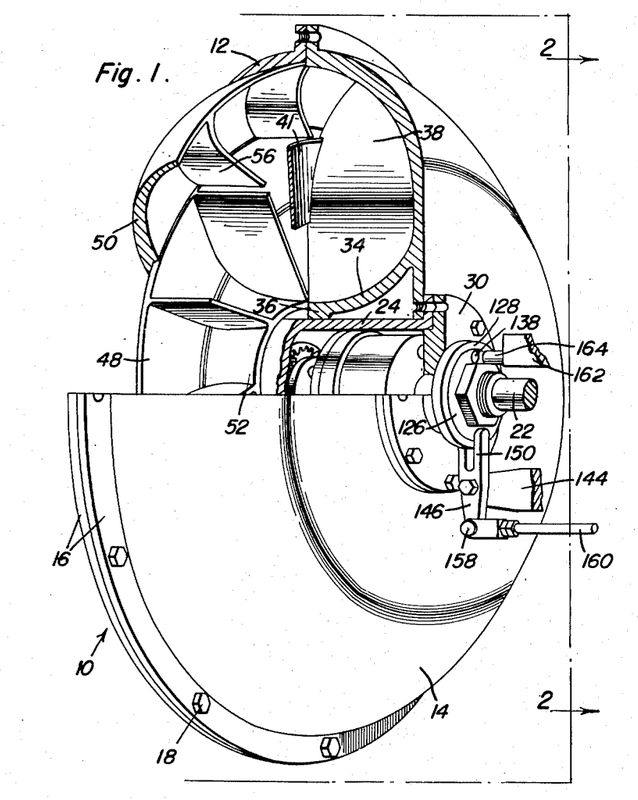
Figure 1 is a perspective view of a preferred embodiment in accordance with the principles of this invention, a part thereof being broken away to show the interior construction thereof.
Figure 2:
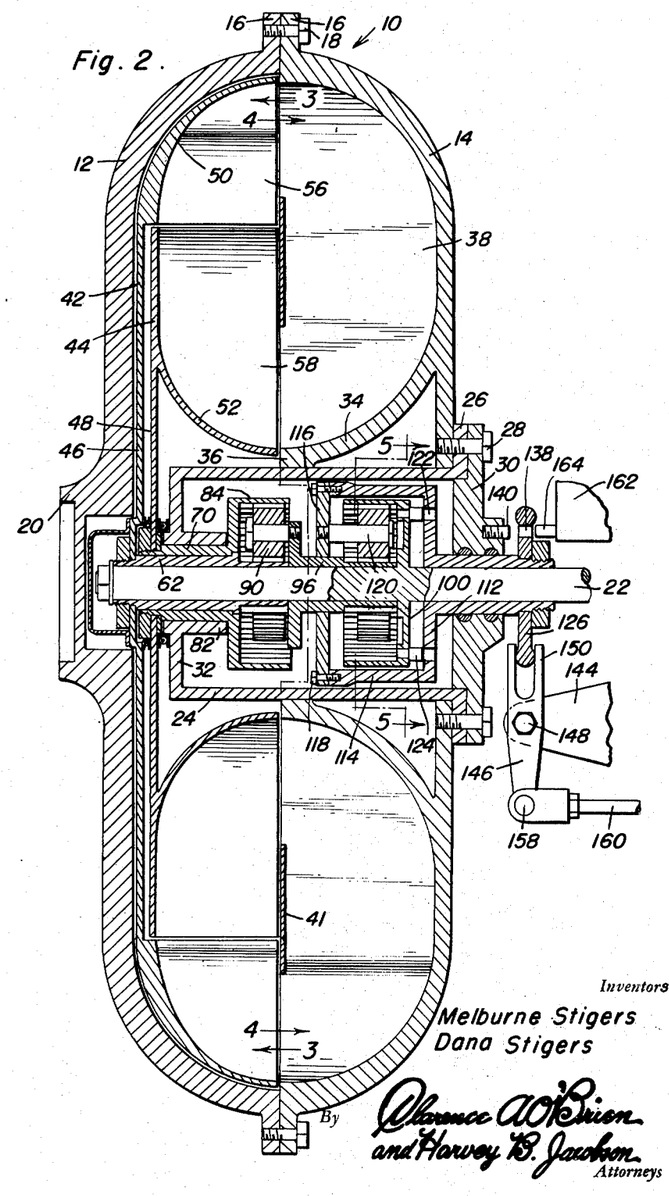
Figure 2 is a vertical central longitudinal sectional view taken substantially upon the plane of the section line 2—2 of Figure 1, the position of the adjustable planetary gear carrier of the second planetary set of gears being indicated in its neutral position, whereby the driving connection of the engine with the driven shaft is broken.

Referring now more specifically to Figures 1 and 2, it will be seen that the fluid transmission in accordance with the principles of this invention comprises a rotatable casing which may form the flywheel of an engine, and is indicated generally by the numeral 10, this casing consisting of a pair of complementary members 12 and 14 which are detachably connected upon peripheral flanges 16 by means of fastening bolts 18.

It is intended that the two sections 12 and 14 of the flywheel 10 shall constitute a fluid-tight chamber and may conveniently and detachably house and receive all of the parts of the planetary gearing sets forming a part of the fluid transmission, as set forth hereinafter.

One of these complementary casing sections such as that at 12 is provided with a hub portion 20 which is adapted to be connected in any desired manner with the crankshaft of an internal combustion engine and constitutes the driving member of the fluid transmission.

Rotatably journaled in the casing 10 and extending through the end wall of the complementary section 14, is a driven shaft 22 which constitutes the output shaft of the fluid transmission. This shaft 22 may form a part of the propeller shaft of an automotive vehicle if desired, or may be suitably connected therewith in various ways as desired. In any event, the shaft 22 will deliver the power from the fluid transmission mechanism, to the driving wheel mechanism of a vehicle or the like, at various speed ratios with respect to the speed of the crankshaft of the engine, in accordance with the operation of the mechanism to be hereinafter described.

Figure 6:
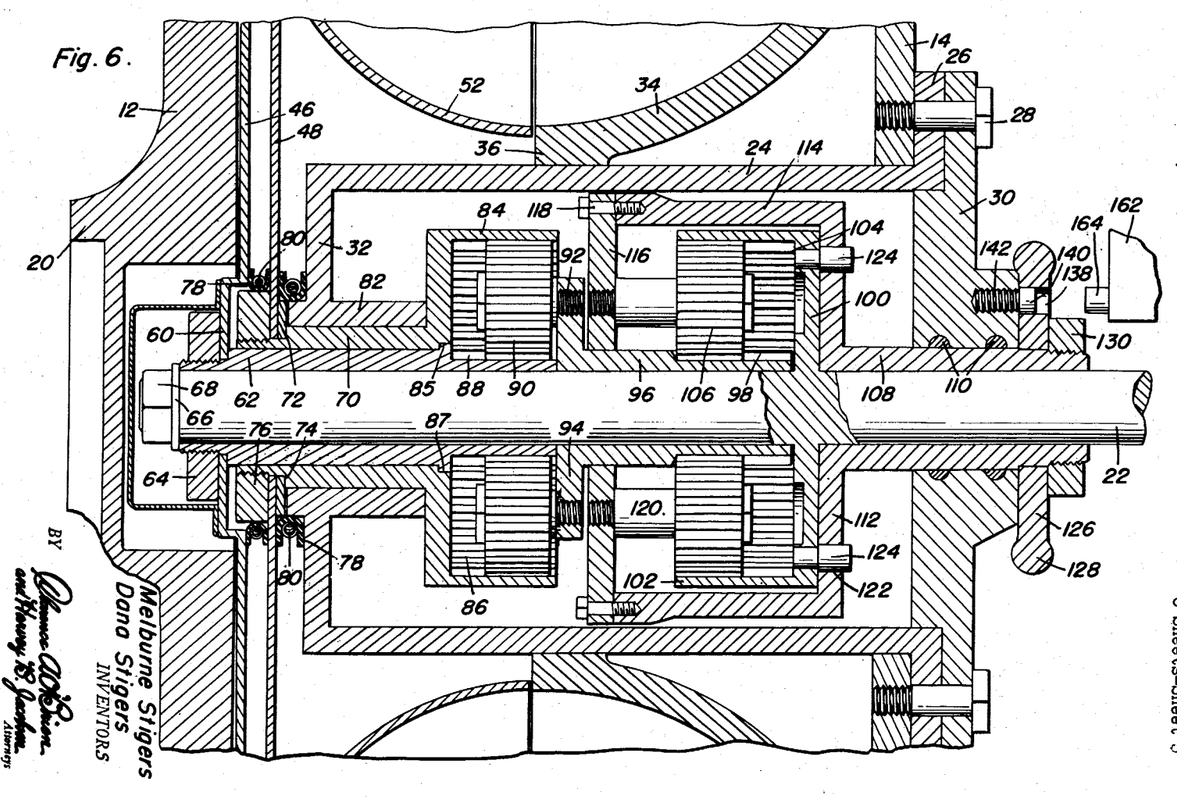
Figure 6 is a view upon an enlarged scale of the gearing mechanism shown in Figure 2, the planetary gear carrier of the second planetary gear set being indicated in position for effecting a direct driving engagement between the engine and the driven shaft.

As will be best seen by reference to Figures 2 and 6, the casing section 14 is provided with a centrally disposed opening for detachably receiving therein a substantially cylindrical cage or housing 24 which is secured to the casing section 14 by means of a flange 26 and suitable fastening bolts 28, a cover plate 30 being provided to close the open outer end of the cage 24 which at its inner end is provided with an end wall or partition 32.

The case or housing 24 is intended to contain and journal the above-mentioned power output shaft 22 and two sets of planetary gears which are associated therewith, whereby the entire gearing assembly may be removed from or inserted and secured within the fluid flywheel casing 10 as a unitary assembly.

As shown in Figures 1, 2 and 6, the flywheel casing section 14 is provided with an annular central wall 34 which terminates in an annular rim 36 which is axially apertured to slidingly receive the outer surface of the case or casing 24, and if desired may establish a fluid-tight joint therewith. In any event, this rim 36 serves to support to some extent the casing 24 intermediate its ends, whereby the casing 24 is supported by the rim 36 and by the flange 26, being secured by the bolts 28.

Figure 4:
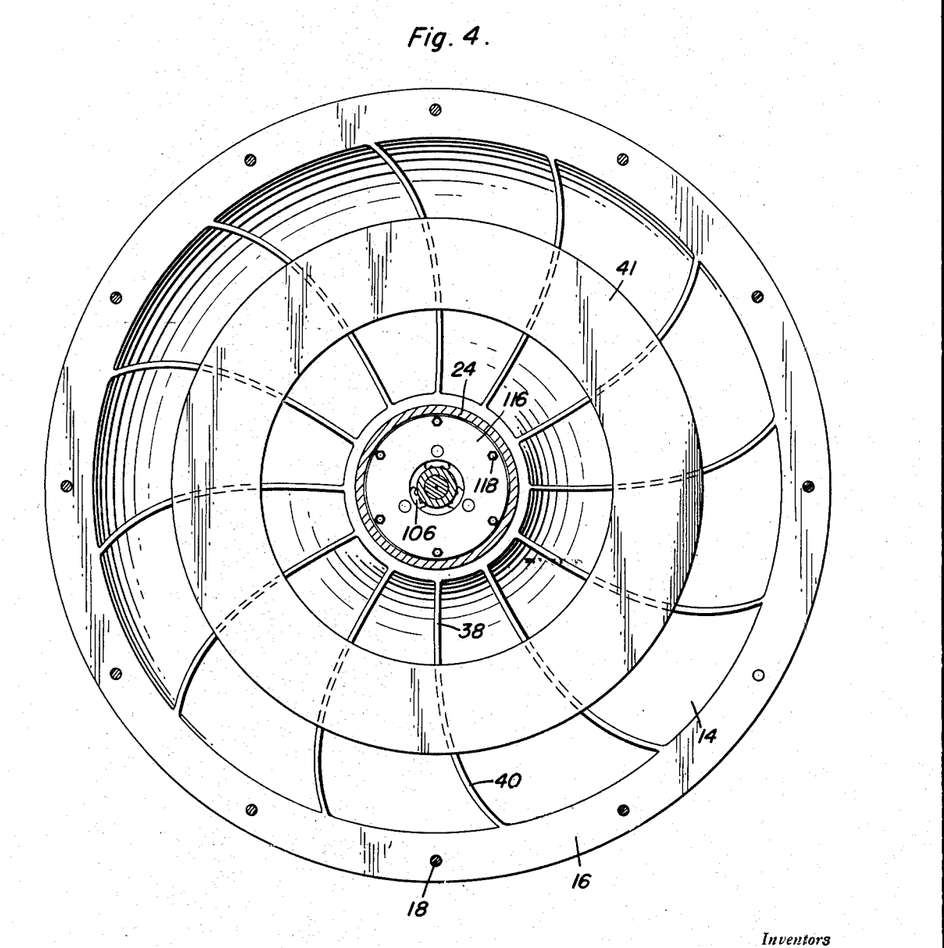
Figure 5:
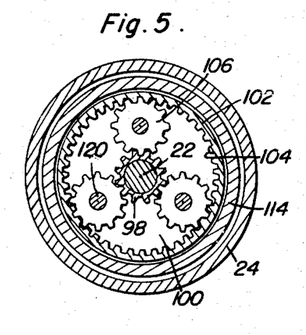
Figure 5 is a fragmentary detail view taken substantially upon the plane of the section line 5—5 of Figure 2 and illustrating the arrangement of the gears in the second planetary gear set of the invention.

As shown best in Figures 1, 2 and 4, the casing section 14 is provided with a plurality of integrally or otherwise rigidly connected vanes or blades 38 which are substantially radially disposed but may be curved at their outer extremities as clearly set forth in Figure 4, as at 40, these vanes thus rotating and forming a part of the casing section 14, whereby the vanes 38 constitute driving vanes of the fluid transmission which are at all times rotatable at the same speed as the flywheel housing and hence as that of the internal combustion engine crankshaft with which this transmission is intended to be associated. An annular web or reinforcing ring 41 may be recessed into and flush with the outer edges of the blades 38 to render this assembly more rigid and to improve the hydraulic operation.

Figure 3:
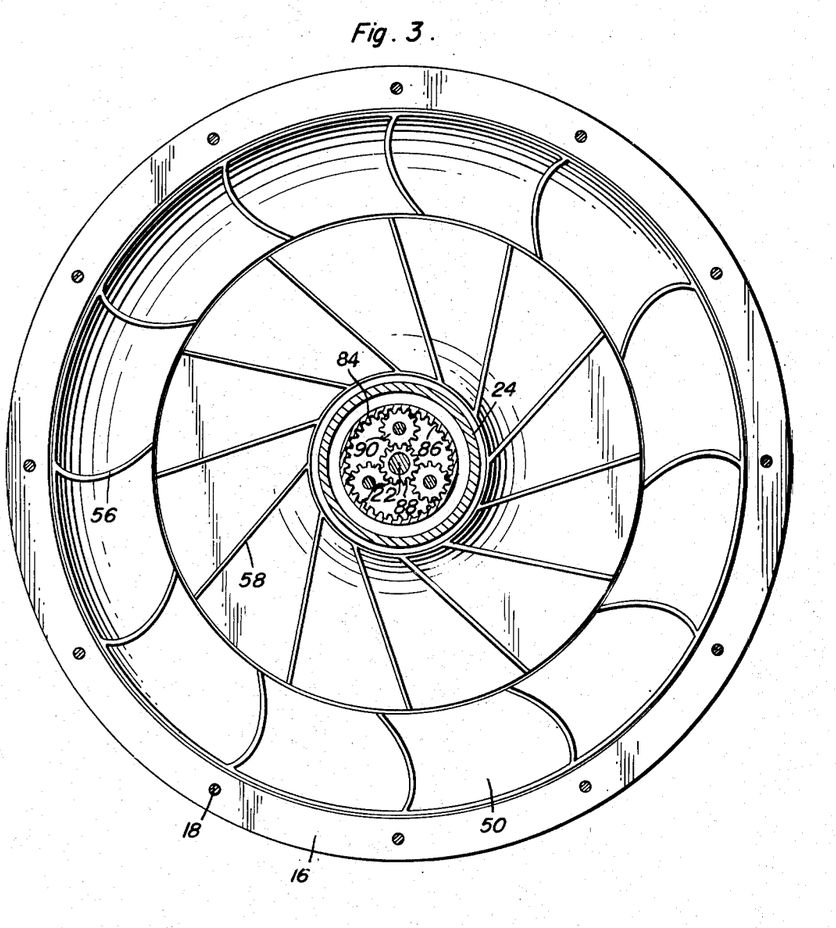
Figures 3 and 4 are vertical central transverse sectional views taken substantially upon the planes of the section lines 3—3 and 4—4, and looking in the direction of the arrows therein, and illustrating the construction of the driving and driven vanes of the fluid transmission mechanism.

As illustrated in Figures 1, 2 and 3, it will be seen that the casing section 12 contains a pair of driven turbine members 42 and 44, each of which has a central annular disk-like portion designated respectively 46 and 48, these disks having complementary, oppositely extending annular dish-shaped portions 50 and 52, respectively, which are so positioned as to form a continuation of the toroidal-shaped chamber of the flywheel housing, of which the member 14 forms the other half.

Driven vanes 56 and 58, respectively, extend from the portions 50 and 52 towards the center thereof, to form two concentric, independently rotatable driven turbine members, the adjacent edges of the blades 56, 58 and 38 being spaced apart merely a sufficient distance to permit mechanical and operational clearance.

It is intended that the space within the casing sections 12 and 14 shall at all times be filled with suitable hydraulic fluid, this hydraulic fluid serving to transmit power and torque from the vanes 38 of the driving rotors 12, 14 of casing 10 to the driven vanes 56 and 58 of the driven rotors 42 and 44, respectively.

Figures 7, 8:
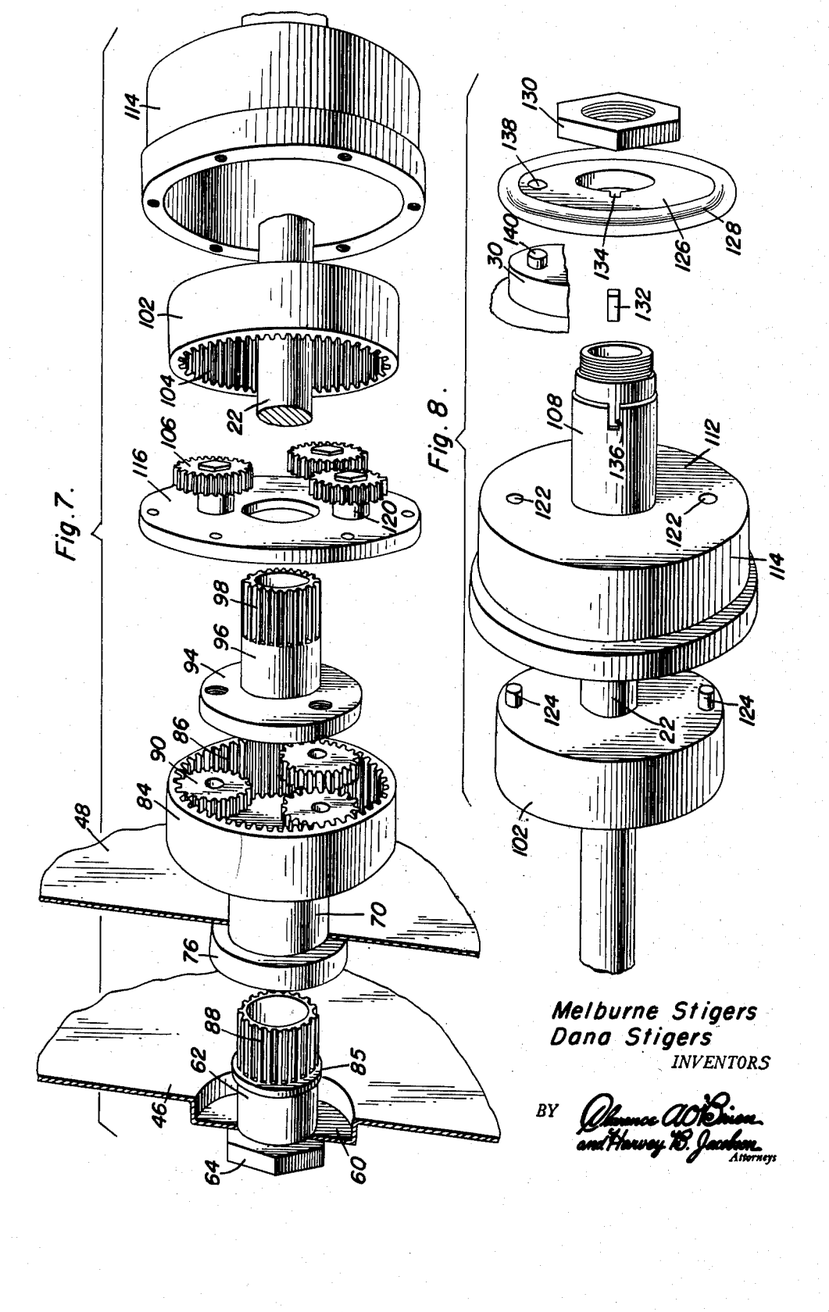
Figure 7 is an exploded perspective view of the gearing assembly of Figure 6, parts being broken away.
Figure 8 is an exploded perspective view of a portion of the second planetary gear set and associated housing thereof forming a part of the invention, a portion of the closure plate of the housing being broken away.

As will be best understood by reference to Figures 2, 6 and 7, the turbine or rotor disk 46 is provided with a central, axially offset hub portion 60 which is rigidly, and non-rotatably but detachably secured to the end portion of a sleeve 62 as by means of a retaining nut 64, whereby rotation of the disk 42 will result in rotation of the sleeve 62.

The sleeve 62 is, in turn, freely rotatable upon the inner extremity of the above-mentioned power output shaft 22, and is removably secured thereto as by a washer 66 and fastening nut 68.

Freely rotatable upon the sleeve 62 is a concentric sleeve 70 to which is rigidly and non-rotatably but removably attached the central portion of the turbine or rotor disk 48, this being seated against a retaining collar 72 which, in turn, seats against a shoulder 74 on the sleeve 70, and a fastening nut 76 secured upon the outer screw-threaded extremity of the sleeve 70. Suitable annular packing members 78 are positioned between the disks 46 and 48 and partition 32 and are retained in fluid-tight, sliding and sealing engagement with the two disks and with the partition 32 as by annular springs or resilient members 80.

As so far described, it will thus be seen that the driven disks 46 and 48 are independently journaled for independently driving the sleeves 62 and 70 for a purpose which will become later apparent.

The innermost wall or partition 32 of the cage 24 is provided with a central hub-like member 82 which constitutes a journal for receiving the sleeve 70, the latter in turn constituting a bearing for the sleeve 62 which is also journaled upon the inner extremity of the power take-off shaft 22.

The other extremity of the sleeve 70 is diametrically enlarged to provide a hollow drum-like flange or rim 84 which is internally geared as at 86 to constitute an internal ring gear or orbit gear of the planetary gear system. Similarly, the extremity of the inner sleeve 62 is provided with circumferential gear teeth 88 whereby the sleeve constitutes a sun gear for the first planetary gear system, the sun gear 88 and orbit gear 84 being concentric. An annular flange 85 upon the sleeve 62 and a complemental annular shoulder 87 in the sleeve 70 serve to limit relative inward motion of the sleeve 70 upon sleeve 62.

The first planetary gear set is completed by a plurality of planet gears 90 which are constantly in mesh with the sun gear 88 and the orbit gear 84, these gears being journaled upon stub axles 92 whose threaded extremities are attached to and carried by a planet carrier plate 94 forming a flanged extremity of a sleeve 96 which likewise is freely rotatable upon the output shaft 22 and is disposed adjacent to the extremity of the sleeve 62.

The extremity of the sleeve 96 is provided with external gear teeth 98 and constitutes the sun gear of a second planetary system. It should be noted that the power output shaft 22 is provided with an integral or if desired a rigidly attached flange 100 which is provided with a laterally extending drum-like rim 102 which is internally toothed as at 104 to provide an internal or orbit gear. The flange 100 likewise serves as a shoulder, whereby the sleeve 96 may be abutted against this flange and the sleeve 62, in turn, abutted against the end of the sleeve 96.

In addition to the sun gear 98 and orbit gear 104, the second planetary gear set includes a plurality of planet gears 106, which planet gears are continuously in mesh with but slidably engaged with the sun gear 98 and orbit gear 104 for a purpose which will subsequently become apparent. The sun and orbit gears 98 and 104 are concentric.

A hub or sleeve member 108 is freely rotatable and slidable upon the power output shaft 22 and is rotatable within an axial bore extending through the cover 30 of the gear cage 24, which bore is provided with suitable annular seals or packing means 110 for preventing the escape of fluid therebetween. At its inner end, the sleeve 108 is provided with a flange-like integral extension 112, which has a laterally and inwardly extending rim 114 which is provided with a removable closure 116 in the form of a plate which is retained as by fastening bolts 118. The plate 116 is centrally apertured to slidably receive the sleeve 96, and the plate journals as by means of screw-threaded stub axles 120, the above-mentioned planetary gears 106. It will thus be seen that as the sleeve 108 is moved or slid axially upon the shaft 22, by means and for a purpose which will subsequently become apparent, the planetary gears 106 carried thereby are likewise moved axially while maintaining their geared relation to the sun gear 98 and orbit gear 104.

At proper positions, the plate 112 is provided with suitable apertures 122 which may detachably receive corresponding pins 124 carried by and extending from the integral plate 100 of the output shaft 22. The arrangement is such that upon axial sliding movement of the sleeve 108, and of the planetary gear carrier 116 associated therewith, the pins 124 carried by the flange 100 of the shaft 22 may be selectively engaged within the apertures 122 or released therefrom whereby the orbit gear 102 and the planetary gear carrier 116 may be selectively locked together for simultaneous rotation or released for independent rotation as set forth hereinafter.

As will be best seen by reference to Figures 2, 6 and 8, a control disk 126, having a circumferential or peripheral bead 128 thereon, is rigidly and non-rotatably secured to the sleeve 108 by means of a fastening nut 130 threaded upon the end of the sleeve, and by means of a key 132, see Figure 8, received in suitable keyways 134 and 136 formed respectively in the inner and outer peripheries of the disk 126 and the sleeve 108.

The control disk 126 is provided with one or more apertures 138 for detachably receiving and seating the extremity 140 of a pin whose screw-threaded inner extremity 142 is seated in the cover plate 30.

It will thus be seen that the control disk 126 and the sleeve 108 may be moved axially for seating the pin 140 in the aperture 138 for thus locking the members 126 and 30 together.

Preferably, the proportions and dimensions of the parts are such that the pins 124 and 140 are successively, respectively engaged in the apertures 122 and 138 and are similarly reversely disengaged therefrom upon appropriate axial shifting movement of the sleeve 108 relative to the output shaft 22 and the flywheel casing 10.

Attention is now again directed to Figures 1, 2 and 6 wherein it will be seen that the control disk 126 constitutes a means whereby the sleeve 108 and the planetary carrier 114 of the second planetary gear system may be adjusted axially. For this purpose, there is mounted upon any suitable fixed part of the framework of the automotive vehicle or assembly with which the fluid coupling of this transmission is associated, such as the portion indicated at 144, a control lever 146 pivoted thereto as at 148 and provided with a yoke portion 150 which straddles the bead 128, and which by its oscillation about the fulcrum 148 will axially shift the control disk while permitting rotation of the same. The lever 146 is pivotally attached as at 158 to any suitable manually operated control means such as the rod indicated at 160.

Upon another portion of the frame of the vehicle such as that indicated at 162, there is provided a stop pin 164 which is adapted to align with the above mentioned recess or aperture 138 in the control disk 126, whereby upon its extreme axial outward movement, the control disk may be seated upon the stationary stop pin 164 and held stationary thereby. Alternatively, as above mentioned, the control disk may be moved inwardly, to seat upon the stop pin 140, whereby the control disk, the sleeve 108 and the planetary carrier of the second planetary gear set may be locked to the rotating flywheel casing 10, 12 and 14.

Obviously, any suitable means desired may be employed for selectively locking or yieldingly biasing or retaining the control lever 146 in its neutral position, in various axially movable positions.

The control member 146 may be shifted to any one of four positions in order to determine and control the action of this mechanism. These positions are: (1) The neutral or idle position, shown in Figure 2, wherein each of the three sets of pins 124, 140 and 164 are disengaged from the apertures 122 and 138. (2) The positive and direct drive position, shown in Figure 6, wherein the sleeve 108 is shifted axially to extreme left-hand position, whereby the pins 124 and 140 are respectively engaged in the apertures 122 and 138, at which time it will be seen that the flywheel casing members 12 and 14, through the closure plate 30, are directly connected by the pin 140 and aperture 138 and the splined connection between the control disk 126 and sleeve 108, to the shaft 22 through the pin and aperture 124 and 122. Thus, the shaft 22 will revolve at the same speed as the flywheel assembly because of the engagement of these pins, thereby lessening wear upon the mechanism parts when the device is in direct drive. (3) Automatic shifting drive whereby the ends of pins 124 will be engaged in the apertures 122, with the pins 140 and 164 being both disengaged from the disk 126; and (4) in reverse, automatic shifting drive wherein the sleeve 108 has been moved axially to the right to its extreme position, whereby the aperture 138 is engaged with the pin 164, both of the pins 124 and 140 being disengaged from apertures 122 and 138.

It should be here noted that when the control lever 146 and the control disk 126 together with the planetary gear carrier 114 of the second planetary gear set are in neutral or idle when in the position shown in Figure 2, whereby the control disk 126 is engaged with none of the pins 140 and 164, and whereby pins 124 are disengaged from aperture 122 no power will be transmitted from the engine by means of the flywheel housing 10 to the power output shaft 22.

The operation of the mechanism in automatic shifting forward drive is as follows. When the internal combustion engine with which this transmission is associated is running at an idling or at a low speed, the rotation of the driving vanes 38 of the flywheel casing 10 will not produce any appreciable centrifugal force upon the fluid within the casing, so that there will be substantially no torque transmitted from the driving vanes 38 to either of the two sets of driven vanes 56 and 58. As the engine speed gradually increases, and the vanes 38 rotate faster, a centrifugal force begins to be developed in the fluid within the transmission casing, so that torque begins to be transmitted from the driving vanes 38 to the two sets of driven vanes 56 and 58. The ring 41 causes the fluid to flow over the outer edge of the ring, through the driven vanes 56 and 58 and back into the driving vanes 38 on the inner edge of the ring 41. Since the vanes 56 are free to rotate with their rotor disk 46, they will rotate in substantially the same direction as the driving vanes 38, but at a lesser speed depending upon the amount of centrifugal force developed within the fluid, so that the sun gear 88 of the first planetary gear set will cause the planetary gears 90 thereof to revolve upon their axles 92. There will be a similar but a lesser torque applied to the vanes 58 and their rotor disk 48, which are directly coupled to the orbit gears 84 of the first planetary gear set, but owing to the lesser diameter and radius of action of the vanes 58 compared to the vanes 56, there will be a differential speed of rotation between the gears 88 and 84. Moreover, since the total torque applied to the two sets of driven vanes 56 and 58, will at idling speeds of the engine be less the load imposed by the output shaft 22 and its associated driving connection with the wheels of the vehicle, the planet carrier plate 94 be subjected to a considerable resistance, so that the same will remain relatively stationary, whereupon the rotation of planet gears 90 will cause the orbit gear 84 and the associated rotor disk 48 with its driven vanes 58 to rotate in a reverse direction from that of the other driven rotor vanes 56 and plate 46. Due to this differential rotation of the orbit and sun gears, it is obvious that the power transmitted from the flywheel through the planet gear carrier plate 94, its sleeve 96 and the sun gear 98 carried thereby, to the secondary planetary gear set and hence to the shaft 22 will be at a low ratio compared to the speed of rotation of the engine. As the engine speed increases, and centrifugal force becomes greater within the flywheel assembly, this ratio diminishes until it approaches unity, at which time the driven shaft 22 will rotate at substantially the same speed as the engine and the flywheel housing.

It will be noted that in the position of the parts for direct automatic shifting drive, the sun gear 98 constitutes the driving source of the second planetary set, this gear causing rotation of the planet gears 106, and the axles 120 of these planet gears are held stationary with respect to the shaft 22 by means of the planet carrier 114 which is pinned as at 124 and 126 to the flange 100 of the shaft 22. Consequently, the orbit 102 of the second planetary set rotates at the same speed as the shaft 22, and this speed by means of the sun gear 98 and planet gears 106, is in direct proportion to the varying ratios established by the driving and driven vanes and the first planetary set.

In summary, it will, therefore, be seen that when the mechanism is placed in its forward, variable ratio automatic shift position, the varying centrifugal forces within the flywheel casing give the infinite speed ratios between the engine and the driven shaft in this position of the parts.

Operation of the parts in reverse, automatic speed ratio shifting drive:

In order to place the apparatus in position for reverse drive of the vehicle from the engine, it is merely necessary to shift the control disk 126 to its extreme right-hand position, whereupon the aperture 138 thereof will engage upon the stationary pin 164, to thereby prevent any rotation of the control disk 126, the sleeve 108, the disk 112, and the planet carrier members 114 and 116, whereby the axis of rotation of the planet gears 106 of the second planetary set will remain stationary. Of course, the pin 124 will be disengaged from the apertures 122 of the stationary member 112, while likewise the pin 142 will be disengaged from the apertures 138 of the control disk.

With the parts in this position, and the sun gear 98 of the second planetary set rotating at varying speed ratios with respect to the driving shaft of the engine, by means of the above described differential action of the driving and driven vanes, it will be seen that the planetary gears 106 are caused to rotate in a different direction. Since the planetary gear carriers are held stationary, this rotation of the planetary gears 106 will cause a reverse rotation of the orbit gear 104 of the orbit gear carrier 102, which by means of the disk 100 is fixed to the shaft 22. Thus, the shaft 22 will be caused to rotate in the opposite direction but at infinite variety of speed ratios with respect to the driving engine.

Operation of the mechanism in direct drive: In direct drive of the mechanism, the parts are disposed in the position shown in Figure 6, whereby rotation of the flywheel members 12 and 14, which are directly driven by and rotated at the same speed as the internal combustion engine, causes rotation of the shaft 22 at the same speed, by means of the connection of the pin 140 in the apertures 138 of the control disk 126 which is keyed to the sleeve 108 which, in turn, by means of the pins 124 and apertures 122, are directly connected to the flange 100 of the shaft 22. Thus, the flywheel is directly connected to the shaft 22, and the torque is imparted thereto by direct stationary connections thus relieving or alleviating the strain upon the planetary gear systems.

It will be seen that the interior of the casing or gear case 24 is thus sealed off from the interior of the rotatable hydraulic chamber of the flywheel 10, whereby the gearing may be packed in lubricant or re-lubricated as desired without interfering with the hydraulic fluid contents of the flywheel casing 10. However, it is also permissible and feasible to establish any suitable connection between the interior of the case 24 and the interior of the flywheel casing 10, whereby the hydraulic fluid may constitute the lubricating means of the gearing assemblies.

From the foregoing, the construction and operation of the device will be readily understood and further explanation thereof is believed to be unnecessary.

Since obvious changes and modifications will readily occur to those skilled in the art after a consideration of the foregoing specification and attached drawings, it is not intended to limit the invention to the exact construction shown and described. Accordingly, all suitable modifications and equivalents may be resorted to falling within the scope of the appended claim.

Having described the invention, what is claimed as new is:

A planetary gearing assembly comprising first and second sets of gears, each set including a driving sun gear, an orbit gear, a planet carrier and planet gears journaled on said carrier and engaging said sun and orbit gears, rotating means for driving the sun and orbit gears of the first set at variable speeds, the planet carrier of the first set being drivingly connected to the sun gear of the second set, and means connecting the orbit gear of the second set to a power output shaft, and means for alternately and selectively holding the planet carrier of the second set stationary or locking it to said rotating means.

MELBURNE STIGERS.
    DANA STIGERS.

REFERENCES CITED

The following references are of record in the file of this patent:

UNITED STATES PATENTS

| Number | Name | Date |
|---|---|---|
| 1,271,079 | Radcliffe | July 2, 1918 |
| 1,814,095 | Saki | July 14, 1931 |
| 2,120,734 | Cotal | June 14, 1938 |
| 2,152,113 | Van Lammeren | Mar. 28, 1939 |
| 2,162,803 | England | June 20, 1939 |
| 2,291,120 | Tipton | July 28, 1942 |
| 2,339,269 | James | Jan. 18, 1944 |
| 2,350,810 | Pentz | June 6, 1944 |
| 2,388,062 | Keller | Oct. 30, 1945 |
| 2,516,385 | Hodge | July 25, 1951 |